United States Patent Office 3,333,970
Patented Aug. 1, 1967

3,333,970
FLAME RESISTANT COMPOSITION
Walter Edward Green, deceased, late of Perivale Greenford, England, by Lloyds Bank Limited, executor, Watford, Hertfordshire, England, assignor to Associated Lead Manufacturers, Limited, London, England, a British company
No Drawing. Filed June 1, 1965, Ser. No. 460,587
11 Claims. (Cl. 106—15)

This application is a continuation in part of application Ser. No. 320,830 filed No. 1, 1963.

Said application describes a novel antimony trioxide of low opacity and having a particle size of the order of 10–20 microns, and the manufacture of said novel antimony trioxide by heating commercially available antimony trioxide, having a fine particle size of the order of 1 to 2 microns, to a temperature in the range of 400–570° C. under conditions in which runaway oxidation is prevented.

Such novel low opacity antimony trioxide is of particular utility as a flameproofing ingredient in synthetic resins and may be incorporated in such resins, in conjunction with a suitable chlorinated hydrocarbon, to render them flameproof. The incorporation of such low opacity antimony trioxide in the resin in place of the normal high opacity antimony trioxide has considerable advantages as will be apparent from the following:

When the recommended quantity of normal commercially available antimony trioxide, that is to say 15 parts by weight of antimony oxide to 100 parts by weight of polyester resin, is used with a chlorinated compound to produce a glass fibre reinforced laminate, then by moulding is opaque. If low opacity antimony trioxide is substituted for the normal antimony trioxide, then the moulding is translucent. This property is of benefit when it is necessary to produce flame retardant roof lightings.

When normal antimony trioxide is incorporated into a pigmented polymer then the intensity of the colour is reduced. When low opacity antimony trioxide is used then it is possible to attain deeper shades of colour with a lower pigment concentration. The appearance of the pigmented polymer is also changed, undertones of white are no longer apparent and a purer colour is obtainable.

The chlorinated hydrocarbon which is incorporated in the resin is preferably a chlorinated paraffin or a chlorinated diphenyl containing 55–80%, and preferably 70% by weight of chlorine. The resin will normally contain 10–40% by weight of low opacity antimony trioxide and at least 10% by weight of chlorinated hydrocarbon. The ratio by weight of the content in the resin of low opacity antimony trioxide to chlorinated hydrocarbon may be 1:3 to 3:1 and is preferably between 1:2 and 2:1.

The resins utilized may be of various kinds, for example polyolefins and polyesters. Of the polyolefins, polyethylene and polypropylene are of particular interest. A polyethylene suitable for the purpose has a melt flow index of between 20 and 0.2 when measured by B.S. 2782 Part 1 method 105C at a temperature of 190° C. and a load of 2.16 kilograms if the melt flow index lies between 1 and 25 and a load of 5.00 kilograms if the melt flow index is below 1. A suitable polypropylene has a melt flow index between 0.2 and 4.5 when measured by the melt flow indexer as described in B.S. 2782 Part 1 method 105C but at a temperature of 230° C. and a 2.16 kilogram load.

The polyester is preferably an unsaturated linear polyester based upon a dibasic acid and a dihydric alcohol which are capable of being cross linked by vinyl monomers to form a thermo-set copolymer.

Resin compositions according to the invention may contain, as the resinous constituent, a substantially unplasticized polyolefin, polyester, cellulose esters other than nitrated cellulose, polyterpene resin, polystyrene, a styrene butadiene copolymer or a styrene butadiene acrylonitrile ter-polymer. Nitrated cellulose cannot be used because it is not practicable to render flame resistant compositions containing nitrated cellulose. The resin may also be a chlorine-containing vinyl polymer or copolymer which has been plasticised with an inflammable plasticiser, such for example as dioctyl phthalate, di-isooctyl phthalate, di-2-ethylhexyl phthalate, dinonyl phthalate, ditridecyl phthalate, dioctyl sebacate, di-isooctyl sebacate, di-2-ethylhexyl sebacate, dioctyl azelate and the product commercially known as dialphanyl phthalate in which the alkyl group is a mixture of compounds containing from 7 to 9 carbon atoms.

The following are examples of typical synthetic resin compositions in accordance with the invention, parts being by weight:

Example 1

A polyester resin was formed by reacting together phthalic anhydride, maleic anhydride and propylene glycol in the proportions of 17:23:30. A flameproof polyester casting was made by dissolving 70 parts of the polyester in 30 parts of styrene and adding to this solution 15 parts of a chlorinated paraffin and 15 parts of low opacity antimony trioxide. When a suitable catalyst was added to this mixture a solid flameproof cross linked co-polymerised polyester was formed.

Example 2

300 parts of polyethylene having a specific gravity of 0.92 and a melt flow index of 20 was mixed on a two roll mill heated to 110° C. with 46 parts of chlorinated paraffin, 46 parts of low opacity antimony trioxide, 5 parts of calcium stearate and 3 parts of tritolyl phosphate, until a homogeneous blend was obtained. The composition was sheeted off and cut into chips. When the chips were fed into a 1" laboratory extruder having a temperature gradient on the barrel ranging from 115° C. at the feed end to 140° C. at the die end and a temperature of 160° C. on the die head and running at 30 r.p.m., it was found possible to extrude flameproof ⅛" diameter rod.

Example 3

A mixture was made of 20 parts of polystyrene, 4 parts of chlorinated paraffin and 2 parts of low opacity antimony trioxide. This mixture was milled on a two roll mill running with a peripheral speed of 13 meters per min. and heated to 170° C. After 15 minutes milling, the mass was found to be homogeneous and could be removed from the mill. The polystyrene was found to be non-inflammable when held in a Bunsen flame for 30 seconds.

Example 4

195 grms. of cellulose proprionate were added slowly to a 12" laboratory two roll mill heated to 177° C. and revolving with a peripheral speed of 14 meters per minute with a friction ratio 1:1.1. Milling was continued until the cellulose proprionate was thoroughly softened and had formed a band around one of the rolls. 45 grms. of low opacity antimony trioxide, 45 grms, of chlorinated paraffin and 15 grms. of tritolyl phosphate mixed together were slowly added and the milling continued until the mixing was complete. The milled sheet was removed from the mill and cooled. Pieces cut from the sheet were found to be self extinguishing when held in a Bunsen flame and removed after 15 seconds.

Example 5

200 grms. of cellulose acetate butyrate were added slowly to a 12" laboratory two roll mill heated to 165° C. and running with a peripheral speed of 9 meters per minute. Milling was continued until the cellulose acetate butyrate was thoroughly softened and had formed a band around one of the rolls. A mixture of 30 grms. of chlorinated paraffin and 40 parts of low opacity antimony trioxide was slowly added and the milling continued until the mixture was homogeneous. The mixture was removed from the mill and cooled. Pieces cut from the removed sheet were found to be non-inflammable when held in a Bunsen flame.

*Example 6*

70 grms. of a polyterpene resin composed of a mixture of low molecular weight products derived from pinene obtained from turpentine, was mixed at a temperature between 140 and 160° C. with 15 grms. of a low opacity antimony trioxide and 15 grms. of chlorinated paraffin. The mixture, when thoroughly mixed, was allowed to cool and harden. Pieces taken from it when held in the flame of a Bunsen burner were found not to burn.

*Example 7*

280 grms. of a styrene butadiene copolymer were added slowly to a 12" two roll laboratory mill heated to 150° C. and running at a peripheral speed of 14 meters per minute. Milling was continued until the copolymer was soft and had formed a band around one of the rolls. A mixture of 60 grms. of low opacity antimony trioxide and 60 grms. of a chlorinated paraffin was added slowly in small portions. Milling was continued until the mixture was homogeneous. The mixture was stripped from the mill and allowed to cool. When held in a Bunsen flame it was found that the mixture was non-inflammable.

*Example 8*

300 grms. of polypropylene were added slowly to a 12" two roll laboratory mill at a temperature of 170° C. running at a peripheral speed of 14 meters per minute. A mixture of 45 grms. of low opacity antimony trioxide and 45 grms. of a chlorinated paraffin was added and the milling continued for ten minutes until the mixture was homogeneous. The mixture when removed from the mill was found to be non-inflammable when placed in a Bunsen flame for 30 seconds.

*Example 9*

The following polyvinyl chloride composition was prepared:

| | |
|---|---|
| Polyvinyl chloride | 100 |
| Dioctyl phthalate | 30 |
| Chlorinated paraffin | 20 |
| Antimony oxide (low opacity) | 8.00 |
| Titanium oxide | 4.00 |
| Stearic acid | 0.25 |
| Dibasic lead phosphite | 6.00 |
| Dibasic lead stearate | 0.75 |

The polyvinyl chloride, antimony oxide, titanium dioxide, stearic acid, dibasic lead phosphite and dibasic lead stearate were mixed in a dough mixer for 20 minutes. The plasticisers and extenders were added and mixing continued until a uniform moist granular mix was obtained. The mix was fed onto a two roll mill running at 12 r.p.m. having a temperature of 150° C. to 160° C. After 10 minutes milling the material was formed into a continuous band and could be removed as a sheet. Pieces cut from the sheet when placed in a Bunsen flame did not burn.

*Example 10*

The following composition was prepared:

| | |
|---|---|
| Vinyl chloride vinylidene chloride copolymer | 100 |
| Dioctyl phthalate | 43 |
| White lead paste 5:1 in dioctyl phthalate | 5 |
| Antimony oxide (low opacity) | 10 |

The copolymer and antimony oxide were mixed in a dough mixer for 15 minutes. The plasticiser and the stabiliser were added and mixing continued for another 10 minutes until the mixture was in a uniform granular state. This was then fed onto a two roll mill running at 12 r.p.m. and heated to 150 to 160° C. After ten minutes milling the material had formed into a continuous band and could be removed from the mill as a sheet. Pieces cut from the sheet when placed in a Bunsen flame did not burn.

As the actual average molecular weight of vinyl polymer is hard to determine, the K value which is obtainable directly from viscosity, is often used as a measure of molecular weight.

Ref: Fikentscher. Cellulose Chemie 13, 58. Penn, W.S., High Polymeric Chemistry, p. 71, Chapman and Hall Ltd., London (1949).

(1) The vinyl chloride vinylidene chloride copolymer used in Example 10 had a K value of 63–67.
(2) The vinyl chloride polymer used in Example 10 had a K value of 72–75.

These are measured at 25° C. when the concentration of the polymer is 0.4% and the solvent is nitrobenzene.

*Example 11*

The following composition was prepared:

| | |
|---|---|
| Acrylo nitrile butadiene styrene ter-polymer | 200 |
| Cerechlor 70 (chlorinated paraffin 70% Cl) | 20 |
| Antimony oxide (low opacity) | 30 |
| Calcium stearate | 1.0 |

The ter-polymer was added slowly to a two roll mill heated to 140° C. and revolving at 12 r.p.m. After 10 minutes had elapsed it was found that the ter-polymer had formed a band about the front roll of the machine. The Cerechlor 70, antimony oxide and the calcium stearate were mixed together and fed slowly onto the plasticised polymer After a further 5 minutes, mixing was complete and the material could be removed as a sheet from the mill. Pieces cut from the sheet when held in the flame of a Bunsen burner did not burn.

Where it is desired to colour such flame-retardant resins far less colouring matter is required to attain a given tint when the low opacity $Sb_2O_3$ of 10–20 micron particle size is used than is required when the conventional more finely divided $Sb_2O_3$ is used. Moreover, colours may be produced of a strength unattainable with conventional $Sb_2O_3$ which, due to its high opacity, imparts a chalky appearance to the resin.

In a particular instance, two batches of a resin of the composition set out in Example 2 were made up, the first containing low opacity $Sb_2O_3$ and the second containing conventional high opacity $Sb_2O_3$. The first required the addition of 54 parts by weight of a standard blue master batch to attain a given colour. The second required the addition of no less than 390 parts by weight of the same blue master batch to attain the same colour.

What is claimed and desired to be secured by Letters Patent is:

1. A translucent flame resistant synthetic resin composition, said composition consisting essentially of a resin selected from the group consisting of substantially unplasticized polyolefins, polyesters formed by reaction of a dibasic acid with a dihydric alcohol, non-nitrated cellulose esters, polyterpene resins, polystyrene, styrene-butadiene copolymers, styrene-acrylonitrile copolymers, styrene-butadiene-acrylonitrile ter-polymers and chlorine containing vinyl polymers plasticized with a plasticizer, 10–40% by weight of the resin of low opacity antimony trioxide having a particle size of about 10–20 microns, and 10–30% by weight of the resin of a chlorinated hydrocarbon containing 55–80% by weight of chlorine and selected from the group consisting of chlorinated paraffins and chlorinated diphenyls.

2. A resin composition as claimed in claim 1, wherein the ratio by weight of low opacity antimony trioxide to chlorinated hydrocarbon is 1:3–3:1.

3. A resin composition as claimed in claim 1, wherein the ratio by weight of low opacity antimony trioxide to chlorinated hydrocarbon is 1:2–2:1.

4. A resin composition as claimed in claim 2, wherein the chlorinated hydrocarbon contains 70% by weight of chlorine.

5. A resin composition as claimed in claim 1, wherein the resin is polyethylene.

6. A resin composition as claimed in claim 1, wherein the resin is polypropylene.

7. A resin composition as claimed in claim 1, wherein the resin is an acrylonitrile-butadiene-styrene copolymer.

8. A resin composition as claimed in claim 1, wherein the resin is polyvinyl chloride alkyl ester plasticised with a plasticiser in which the alkyl group has from 7 to 10 carbon atoms, said plasticizer being selected from the group consisting of alkyl phthalates, alkyl sebacates and alkyl azelates.

9. A resin composition as claimed in claim 1, wherein the resin is a vinyl chloride-vinylidene chloride copolymer plasticised with an alkyl ester placticiser in which the alkyl group has from 7 to 10 carbon atoms, said plasticizer being selected from the group consisting of alkyl phthalates, alkyl sebacates and alkyl azelate.

10. A resin composition as claimed in claim 1, wherein the resin is an unsaturated linear polyester formed by the reaction of a dibasic acid with a dihydric alcohol.

11. A pigmented flame resistant synthetic resin composition having true color of the pigment, said composition consisting essentially of a resin selected from the group consisting of substantially unplasticized polyolefins, polyesters, formed by reaction of a dibasic acid with a dihydric alcohol, non-nitrated cellulose esters, polyterpene resins, polystyrene, styrene-butadiene copolymers, styrene-acrylonitrile copolymers, styrene-butadiene-acrylonitrile terpolymers and chlorine containing vinyl polymers plasticized with a plasticizer, 10–40% by weight of the weight of the resin of low opacity antimony trioxide having a particle size of about 10–20 microns, and 10–30% by weight of the resin of a chlorinated hydrocarbon containing 55–80% by weight of chlorine and selected from the group consisting of chlorinated paraffins and chlorinated diphenyls, and a coloring pigment.

References Cited
UNITED STATES PATENTS

| | | | |
|---|---|---|---|
| 2,590,211 | 3/1952 | Rugar | 106—15 |
| 2,669,521 | 2/1954 | Bierly | 106—15 |

ALEXANDER H. BRODMERKEL, *Primary Examiner.*

L. B. HAYES, *Assistant Examiner.*